(12) United States Patent
Wang et al.

(10) Patent No.: US 7,889,258 B2
(45) Date of Patent: Feb. 15, 2011

(54) DUAL SENSITIVITY IMAGE SENSOR

(75) Inventors: Yibing (Michelle) Wang, La Jolla, CA (US); Sandor Barna, Pasadena, CA (US)

(73) Assignee: Aptina Imaging Corporation, George Town (KY)

( * ) Notice: Subject to any disclaimer, the term of this patent is extended or adjusted under 35 U.S.C. 154(b) by 0 days.

(21) Appl. No.: 12/557,670

(22) Filed: Sep. 11, 2009

(65) Prior Publication Data

US 2010/0002118 A1 Jan. 7, 2010

Related U.S. Application Data

(63) Continuation of application No. 11/216,172, filed on Sep. 1, 2005, now Pat. No. 7,605,855, which is a continuation of application No. 09/596,757, filed on Jun. 15, 2000, now Pat. No. 6,972,794.

(60) Provisional application No. 60/139,345, filed on Jun. 15, 1999.

(51) Int. Cl.
*H04N 3/14* (2006.01)

(52) U.S. Cl. ..................................... 348/308

(58) Field of Classification Search ................. 348/308; 250/208
See application file for complete search history.

(56) References Cited

U.S. PATENT DOCUMENTS

| 5,471,515 | A | 11/1995 | Fossum et al. ................ 377/60 |
| 5,483,091 | A | 1/1996 | West et al. |
| 5,600,451 | A | 2/1997 | Maki |
| 5,714,753 | A | 2/1998 | Park |
| 5,737,016 | A | 4/1998 | Ohzu et al. |
| 5,886,343 | A | 3/1999 | Miyawaki et al. |
| 5,898,168 | A | 4/1999 | Gowda et al. |
| 5,907,357 | A | 5/1999 | Maki |
| 6,046,466 | A | 4/2000 | Ishida et al. |
| 6,078,037 | A | 6/2000 | Booth |
| 6,115,065 | A | 9/2000 | Yadid-Pecht et al. |
| 6,307,195 | B1 * | 10/2001 | Guidash .................. 250/208.1 |
| 6,665,013 | B1 | 12/2003 | Fossum et al. |
| 6,710,804 | B1 | 3/2004 | Guidash |

(Continued)

OTHER PUBLICATIONS

Kirkish, et al., "Optical Characteristics of CMOS-Fabricated MOSFET's", Apr. 1987, IEEE Journal, No. 2, vol. SC-22, pp. 299-301.

(Continued)

*Primary Examiner*—Jason Chan
*Assistant Examiner*—Joel Fosselman

(57) ABSTRACT

A system of taking images of different sensitivities at the same time uses both an image sensor, and an auxiliary part to the image sensor. The image sensor element can be a photogate, and the auxiliary part can be the floating diffusion associated with the photogate. Both the photogate and the floating diffusion accumulate charge. Both are sampled at different times. The floating diffusion provides a lower sensitivity amount of charge than the photogate itself. The system can have a photogate and floating diffusion in each pixel along with a select transistor, a reset transistor, and a follower transistor. All of this circuitry can be formed of CMOS for example. The system can also operate in a column/parallel mode, where each column of the photo sensor array can have a column signal processor which samples and holds the reset signal, the floating diffusion signal and the photogate signal.

12 Claims, 3 Drawing Sheets

U.S. PATENT DOCUMENTS

| | | |
|---|---|---|
| 6,724,426 B1 | 4/2004 | Berezin et al. |
| 2002/0033894 A1 | 3/2002 | Watanabe et al. ........... 348/312 |

OTHER PUBLICATIONS

Orly Yadid-Pecht et al., "Wide Intrascene Dynamic Range CMOS APS Using Dual Sampling"; 1997 IEEE Workshop on Charge-Coupled Devices and Advanced Image Sensors; paper #R15.[Month unknown].

Sypros Kavadias et al., "On-chip Offset Calibrated Logarithmic Response Image Sensor", 1999 IEEE Workshop on Charge-Coupled Devices and Advanced Image Sensors, pp. 68-71, (Month unknown).

M. Loose et al., "Self-Calibrating Logarithmic CMOS Image Sensor with Single Chip Camera Functionality", 1999 IEEE Workshop on Charge-Coupled Devices and Advanced Image Sensors, pp. 191-194, (Month unknown).

N. Ricquier, at al., "Active Pixel CMOS Image Sensor with On-Chip Non-Uniformity Correction", 1995 IEEE Workshop on Charge-Coupled Devices and Advanced Image Sensors, (Month unknown).

J. Huppertz et al., "Fast CMOS Imaging with High Dynamic Range", 1997 IEEE Workshop on Charge-Coupled Devices and Advanced Image Sensors, pp. 1-4, (Month unknown).

S. Decker et al., "Comparison of CCD and CMOS Pixels for a Wide Dynamic Range Area Imager", 1995 IEEE Workshop on Charge-Coupled Devices and Advanced Image Sensors, pp. 1-5, (Month unknown).

S. Decker et al., "A 256.times.256 CMOS Imaging Array with Wide Dynamic Range Pixels and Column-Parallel Digital Output", IEEE Journal of Solid-State Circuits, vol. 33, No. 12, Dec. 1998, pp. 2081-1091.

* cited by examiner

DUAL SENSITIVITY IMAGE SENSOR

This application is a continuation of U.S. patent application Ser. No. 11/216,172, filed Sep. 1, 2005, now U.S. Pat. No. 7,605,855 which is a continuation of U.S. patent application Ser. No. 09/596,757, filed Jun. 15, 2000, now U.S. Pat. No. 6,972,794, which claims priority from Provisional Application No. 60/139,345, filed Jun. 15, 1999, the entirety of each being incorporated herein by reference.

BACKGROUND OF THE INVENTION

The dynamic range of a typical CMOS image sensor is between 65 and 75 dB. The scene dynamic range, however, may extend over more than 5 orders of magnitude. If the scene dynamic range exceeds the sensor dynamic range, then portions of the image may be clipped or distorted in the darkest or brightest areas of the scene.

Techniques for extending dynamic range have included using both non-linear sensors and linear sensors. The non-linear sensors may cause image lag, have a large pixel size, cause inflexible or destructive compression, loss of contrast, increased noise or long integration time. Linear sensors may have excellent contrast and improved noise processing. They may also produce excellent opportunities for post-processing, since the output is typically directly related to the input.

A high dynamic range linear sensor often takes several integrations of the same scene. Each integration has a different integration time. The varying sensitivity of the different integrations can provide more information about the scene. When each integration is completed, each pixel may be accessed several times to obtain all the information, which may decrease the frame rate of the sensor. A frame memory may also be necessary to temporarily store the results of the integration.

BRIEF SUMMARY OF THE INVENTION

The present system uses obtains two integrations of the same image, at the same time, using a photoreceptor, and the auxiliary part for the photoreceptor.

An embodiment discloses using a photogate which has an associated floating diffusion used. Both the photogate and the floating diffusion simultaneously acquire information about the image. The photogate may be more efficient and produces a higher sensitivity value than the floating diffusion. In this way, both a high and low sensitivity version of the image can be obtained. The information may have an increased dynamic range.

BRIEF DESCRIPTION OF THE DRAWINGS

These and other aspects will now be described in detail with reference to the accompanying drawings.

DETAILED DESCRIPTION OF THE INVENTION

The present application describes using a photoreceptor of a type that has an associated part that stores charge. The photoreceptor can include a photogate and the associated part can be a floating diffusion that stores charge from the photogate. This can facilitate obtaining two images of the same scene at the same time. The two images have different sensitivities. It is recognized by the present inventors that the photogate pixel actually has two electron collecting areas. The photogate itself collects electrons. The floating diffusion areas also collects electrons, but does so at a lower efficiency, as compared with the photogate.

Hence, during the integration period, the photogate area generates a higher sensitivity signal, and the floating diffusion generates a lower sensitivity signal. The lower sensitivity signal may have an integration time which is equal to or less than the integration time of the higher sensitivity signal. The lower sensitivity node is 30 to 40 times less sensitive than the high sensitivity node. This sensitivity, however, can vary depending on the ratio between photogate area and area of the floating diffusion. Different pixels can be designed with different ratios. These can be determined, for example, by trial and error.

Figure 1A:
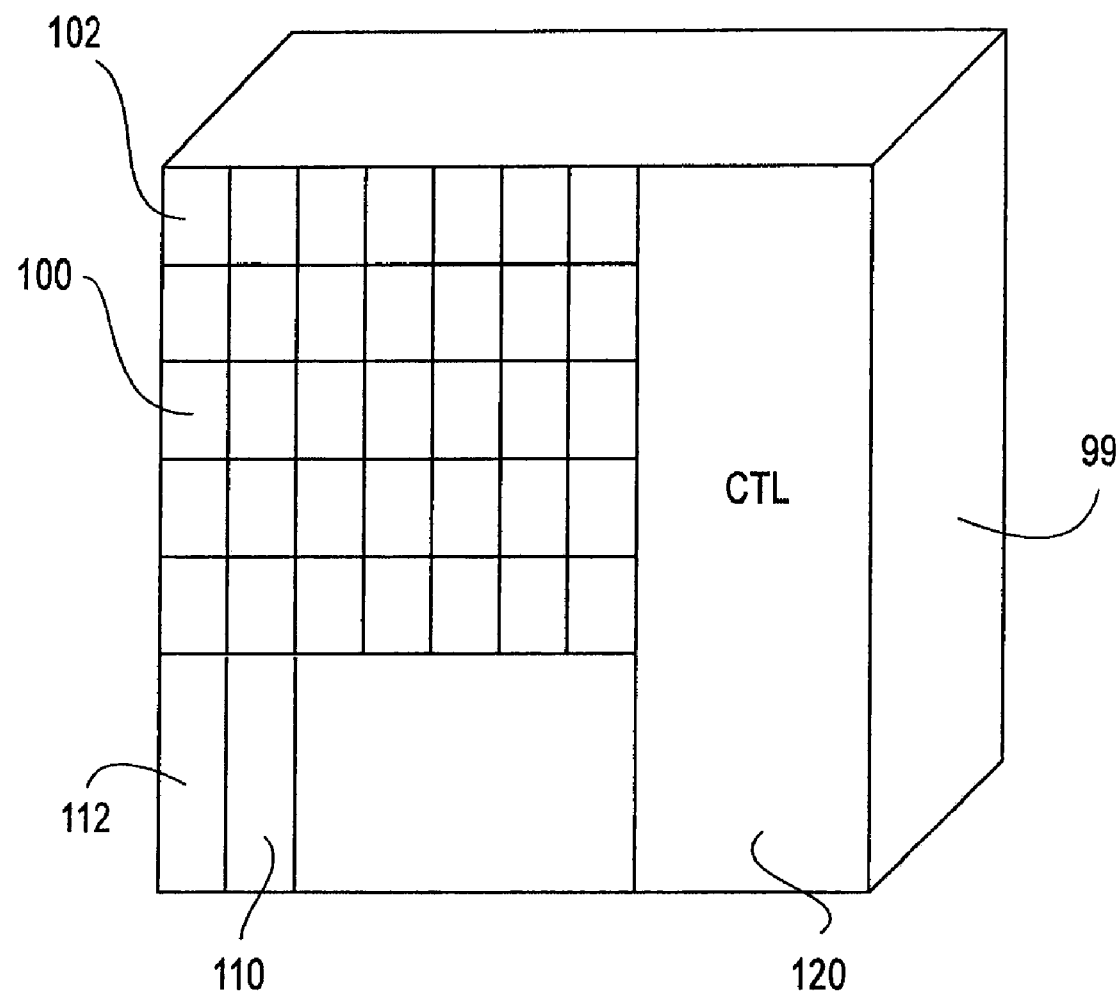
FIG. 1A shows the layout of a CMOS image sensor array including the image acquisition part and the signal processing part.

FIG. 1A shows an overall layout of the sensor chip. The signal silicon substrate 99 has integrated therein a photosensor array 100 which includes a plurality of pixel photosensor elements arranged in rows and columns. Each of the pixels, such as 102, preferably has the same structure. The same substrate 99 also includes an image processor part 110, formed of a plurality of circuits 112. Each of the image processor circuits preferably has identical structure. Also integrated on the chip 99 is a controlling element 120, which produces control signals that control the flow of the operation on the chip.

Each of the transistors on the substrate are preferably formed of MOS type circuit elements. The control structure can be CMOS.

Figure 1B:
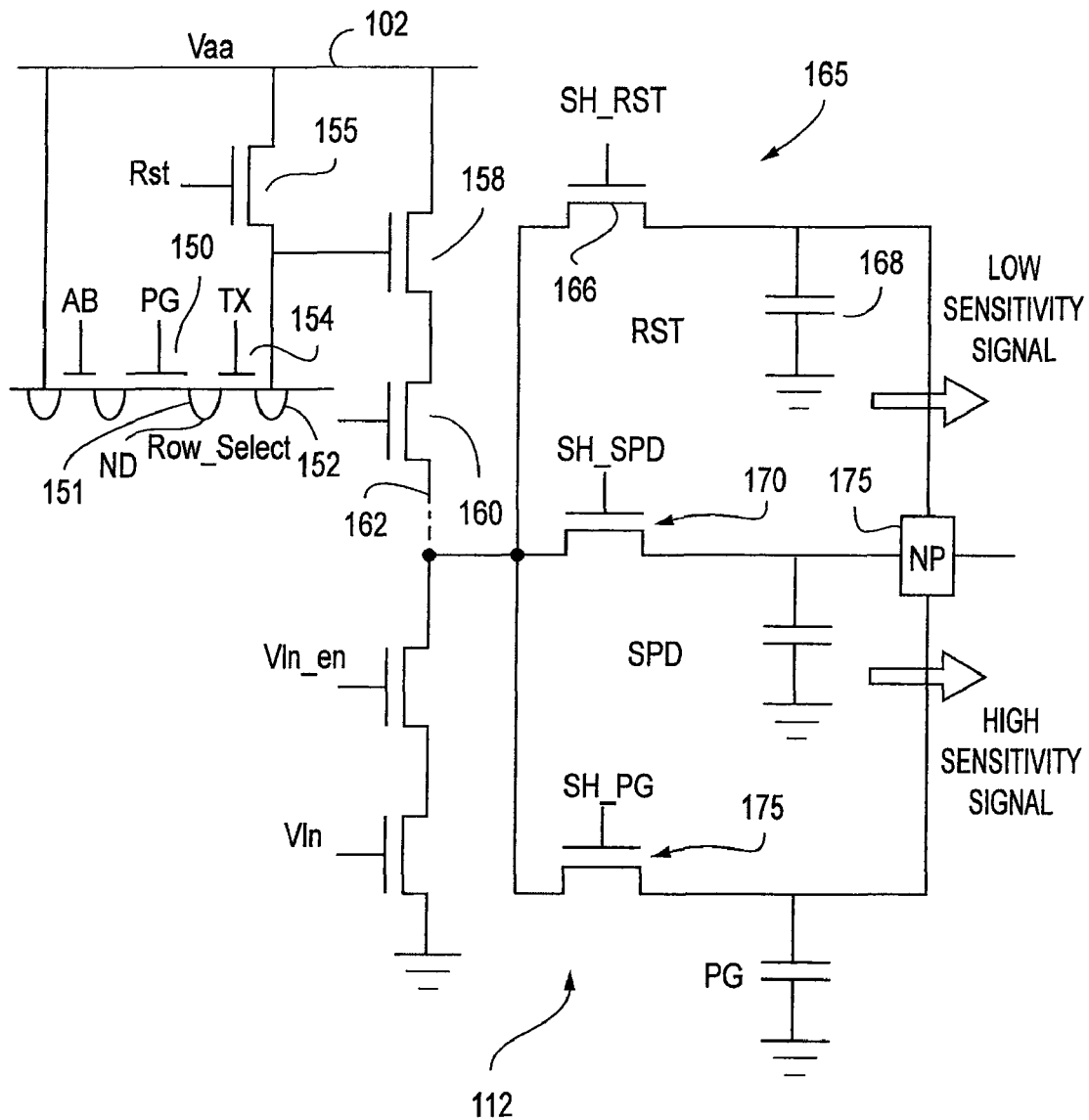
FIG. 1B shows a circuit diagram of a single pixel and a single part of the column signal processor.

FIG. 1B shows a detailed schematic of the structure of the pixels 102 and an associated processing circuit 112. The signals described herein are produced by the control circuit 120, which can be a small processor, or can be hardwired logic, which is created using hardware definition language. The system preferably uses a photosensor having an associated charge storage part. One recognition of the present application is that this associated charge storage part will also integrate charge from incoming light. However, the charge integration may be less efficient than the actual photoreceptor. In this embodiment, the photoreceptor is a photogate 150, which has an associated node 151. The node 151 is maintained separated from a floating diffusion 152. A transfer gate 154 seperates the charge stored in the photogate 150 from the floating diffusion 152. The TX gate is held at a fixed voltage of about 1.2 volts, which is a slightly "ON" state. This forms a barrier to the charge under the photogate, when the photogate is biased high, say at 5 volts. When the photogate is pulsed low, e.g., to 0 volts, the TX gate forms a channel, allowing the charge to pass to the floating diffusion. The control of the photogate voltage PG is produced by the control circuit 120.

The level of the floating diffusion can be adjusted by the reset transistor 155. The reset signal RXT connects the reset transistor to the voltage $V_{AA}$, which is a reset voltage. The level on floating diffusion 152 is also buffered by a follower 158, and can be sampled. A row select transistor 160 is actuated by the control circuit 120 to select that specified row of pixels. A plurality of other row select transistors from different rows are connected to the node 162. Preferably, only one row is selected at any one time. Each column of pixels is associated with a column signal processor shown as 112. The column signal processor processes the signals described herein. As shown, three sample and hold circuits are provided. A first sample and hold circuit 165 stores the reset level. The SH_RST signal from the control circuit 120 turns on the transistor 166 thus storing the reset level into the capacitor 168. Analogously, the other sample and hold circuit 170 stores the floating diffusion level, and the third sample and hold circuit 175 stores the photogate signal. An arithmetic processor 175 can be provided to provide any desired combination of these signals.

The low sensitivity signal can correspond to the floating diffusion values subtracted from the reset value. The photogate value can correspond to the photogate sample and hold level, subtracted from the floating diffusion value, and optionally also subtracted from the reset value. Each of the pixels in a specific row receives the same row select signal to the base of the transistor 160 that is associated with each pixel in that row. This turns on all of the transistors in a row at once, thereby selecting the entire row at once. All transistors in all other rows are maintained off. One value for each column is thereby obtained at any time, into a corresponding signal processing unit 112. This allows the system to operate in a so-called column/parallel mode wherein an entire row of pixel outputs are obtained.

Figure 2:
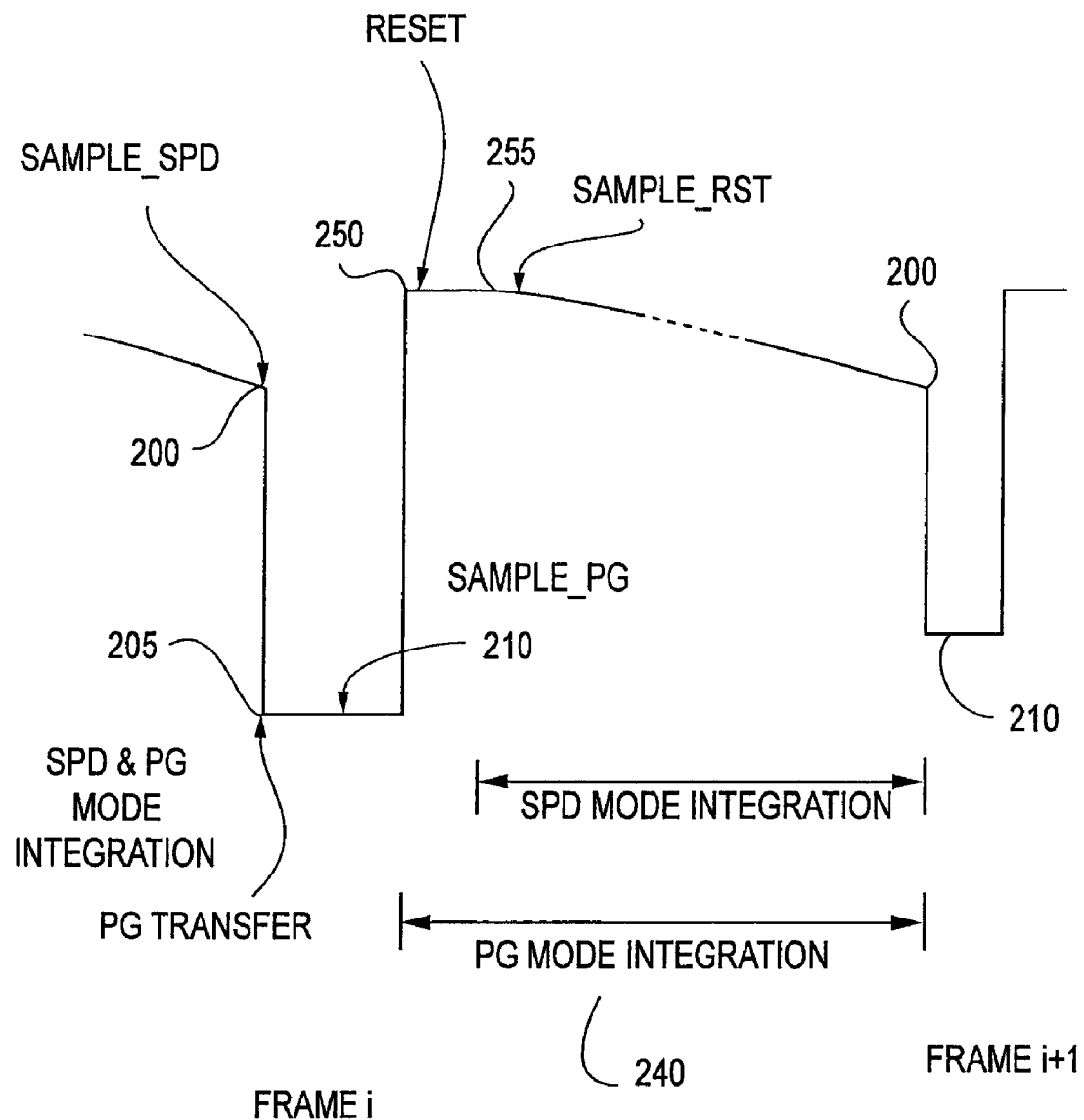
FIG. 2 shows a diagram illustrating the flow of operation.

The operation occurs as shown in FIG. 2. During each cycle, the system is first reset as shown as 250, to a reset level. The reset value is sampled at 255. The reset value is sampled during this time by selecting the row, and actuating the SH_RST signal to provide the reset signal onto the associated capacitor 168. The photogate mode integration begins at the time of reset shown as 240. The floating diffusion integration begins at time 245, after the sample reset value is detected.

At the end of the integration time, the floating diffusion 152 has integrated charge. This is sampled at time 200, to obtain the value of the FD sample. This value is then actuated into the sample and hold circuit 170. The photogate also includes charge. After sampling the floating diffusion, the transfer gate 154 is actuated by producing the signal TX from the controller. This dumps the charge from the photogate 150 into the floating diffusion and the floating diffusion is again sampled at 210 to obtain the photogate value. This value is then held in the sample and hold 175.

Both the photogate and the floating diffusion integrate during the same time period. At least 80% of the integration time is preferably common. The time of integration of the FD may be slightly less, to accommodate sampling values on the floating diffusion. However, since the time of integration is mostly common, the same scene is imaged.

Although only a few embodiments have been disclosed in detail above, other embodiments are possible. For example, while the embodiment disclosed above describes using the photogate, it could also be done with other kinds of light sensing devices. An important feature is that two different levels of charge, at two different sensitivities, are sampled into different node at least partly simultaneously.

All such modifications are intended to be encompassed within the following claims.

What is claimed is:

1. A dual sensitivity pixel comprising:
   first and second photosensors, the first photosensor being of a higher light sensitivity than the second photosensor;
   a transfer gate positioned between the first and second photosensors; and
   readout circuitry connected to the second photosensor operable to produce output signals corresponding to charge produced by each of the first and second photosensors during respective first and second overlapping integration periods,
   wherein the first photosensor is readout by sampling charge stored in the second photosensor after the transfer gate positioned between the first and second photosensors is activated to cause charge produced by the first photosensor to be transferred to the second photosensor.

2. The dual sensitivity pixel of claim 1, wherein the second photosensor is configured as a floating diffusion region.

3. The dual sensitivity pixel of claim 1, further including a reset transistor, connected between a reset voltage terminal and the second photosensor.

4. The dual sensitivity pixel of claim 3, wherein the readout circuitry is operable to:
   reset the second photosensor to a reset level,
   sample the reset level,
   allow the second integration period to elapse, and
   sample a pixel image signal level from the second photosensor,
   before the transfer gate is activated to cause charge from the first photosensor to be transferred to the second photosensor.

5. The dual sensitivity pixel of claim 1, wherein the readout circuitry comprises separate sample and hold circuitry for sampling each of a pixel reset level and pixel image signal levels from the first and second photosensors.

6. The dual sensitivity pixel of claim 5, wherein the readout circuitry is configured to output a first, low sensitivity output indicative of a difference between the pixel image signal level from the second photosensor and the pixel reset level and a second, high sensitivity output indicative of a difference between the pixel image signal level from the first photosensor and the pixel reset level.

7. The dual sensitivity pixel of claim 1, wherein the first and second integration period overlap for at least 80 % of a common integration period.

8. An image processor, comprising a processor; and
   an imager, comprising:
   a pixel array arranged in rows and columns, at least one pixel in the array comprising:
   high and low sensitivity photosensors;
   a transfer gate positioned between the high and low sensitivity photosensors; and
   readout circuitry connected to the low sensitivity photosensor operable to produce output signals corresponding to charge produced by each of the high and low sensitivity photosensors during respective first and second overlapping integration periods,
   wherein the high sensitivity photosensor is readout by sampling charge stored in the low sensitivity photosensor after the transfer gate positioned between the high and low sensitivity photosensors is activated to cause charge produced by the high sensitivity photosensor to be transferred to the low sensitivity photosensor.

9. The image processor of claim 8, wherein the low sensitivity photosensor is configured as a floating diffusion region.

10. The image processor of claim 8, wherein the high sensitivity photosensor is about 30-40 times more sensitive to light than the low sensitivity photosensor.

11. The image processor of claim 8, wherein the readout circuitry comprises separate sample and hold circuitry for sampling each of a pixel reset level and pixel image signal levels from the high and low sensitivity photosensors.

12. The image processor of claim 8, further comprising a control circuit, operating to control said first and second integration periods such that the first integration period is at least as long as the second integration period and the overlap between the two periods is at least 80%.

* * * * *